US008890890B2

(12) United States Patent
Fisher et al.

(10) Patent No.: US 8,890,890 B2
(45) Date of Patent: Nov. 18, 2014

(54) PLUGGABLE WEB-BASED VISUALIZATIONS FOR APPLICATIONS

(75) Inventors: Danyel Fisher, Seattle, WA (US); Roland Fernandez, Woodinville, WA (US); Steven Mark Drucker, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 900 days.

(21) Appl. No.: 12/788,222

(22) Filed: May 26, 2010

(65) Prior Publication Data
US 2011/0292072 A1 Dec. 1, 2011

(51) Int. Cl.
*G06T 11/20* (2006.01)
*G06T 11/60* (2006.01)
*G06F 17/30* (2006.01)

(52) U.S. Cl.
CPC ........ *G06F 17/30905* (2013.01); *G06T 11/206* (2013.01); *G06T 11/60* (2013.01)
USPC ............................. 345/619; 345/629; 345/440

(58) Field of Classification Search
CPC ................................................ G06F 17/30905
USPC .......................................................... 345/440
See application file for complete search history.

(56) References Cited

U.S. PATENT DOCUMENTS

| 6,691,281 | B1 | 2/2004 | Sorge | |
|---|---|---|---|---|
| 2003/0028591 | A1* | 2/2003 | Goloshubin et al. | 709/203 |
| 2003/0139989 | A1* | 7/2003 | Churquina | 705/35 |
| 2006/0112123 | A1 | 5/2006 | Clark | |
| 2006/0130016 | A1* | 6/2006 | Wagner | 717/136 |
| 2006/0218563 | A1* | 9/2006 | Grinstein et al. | 719/328 |
| 2007/0124291 | A1* | 5/2007 | Hassan et al. | 707/3 |
| 2009/0102846 | A1* | 4/2009 | Flockermann et al. | 345/440 |

OTHER PUBLICATIONS

Mehta, T., Using the Google Chart API with Microsoft Excel, Jan. 12, 2008, Internet Archive Wayback Machine, archived on Jan. 12, 2008, from http://web.archive.org/web/20080112145029/http://www.tushar-mehta.com/publish_train/xl_vba_cases/excel_google_chart_api/index.htm.*

Danyel Fisher, Steven M. Drucker, Roland Fernandez, and Scott Ruble, Visualizations Everywhere: A Multiplatform Infrastructure for Linked Visualizations, 2010, IEEE Transactions on Visualization and Computer Graphics, vol. 16, No. 6, pp. 1157-1163.*

John Scott Hawker and Keith E. Massey, Toward Distributed, Pluggable Tools and Data: Re-Engineering a Data Analysis Architecture, 2008, ResearchGate, pp. 1-6.*

(Continued)

*Primary Examiner* — Jeffery A Brier
(74) *Attorney, Agent, or Firm* — Cassandra T Swain; Judy Yee; Micky Minhas (57) ABSTRACT

The pluggable web-based visualization technique described herein pertains to a method for providing pluggable web-based visualizations for applications. The method selects visualizations from the web to be embedded into a host application on a desktop computing device. The visualizations can be plugged in to a variety of host applications. This empowers end-users, application designers, and visualization designers by allowing greater reuse of existing code. Additionally, end-users do not have to wait for new revisions of existing applications to use the latest techniques. Designers of domain specific visualizations can work on just the visualization and have them incorporated into a variety of different host applications. Users can perform local processing and visualizations on their own machine, yet obtain new visualizations from the web where they can be updated more frequently and where special purpose visualizations are available.

19 Claims, 5 Drawing Sheets

(56) References Cited

OTHER PUBLICATIONS

Dundas Data Visualization Inc., Introduction to Dundas SharePoint web part data sources, retrieved Apr. 5, 2010 from http://support2.dundas.com/?Article=1318&NewsletterID=012009.

Greenpoint Inc., WebCharts3D, retrieved Apr. 5, 2010 from http://www.gpoint.com/.

Mehta, T., Using the Google Chart API with Microsoft Excel, retrieved Apr. 5, 2010 from http://www.tushar-mehta.com/publish_train/xl_vba_cases/excel_google_chart_api/.

Microsoft Corp., Supplying data to a chart control, retrieved Apr. 5, 2010 from http://msdn.microsoft.com/en-us/library/aa141474(office.10,printer).aspx.

Microsoft Corp., Working with the Office web components, retrieved Apr. 5, 2010 from http://msdn.microsoft.com/en-us/library/aa198515(office.10,printer).aspx.

W3AVENUE, Create web based spreadsheet with jQuery.Sheet, Mar. 19, 2010, http://www.w3avenue.com/2010/03/19/create-web-based-spreadsheet-with-jquery-sheet/.

\* cited by examiner

PLUGGABLE WEB-BASED VISUALIZATIONS FOR APPLICATIONS

A visualization's purpose is to communicate data by producing an image so that the viewer can learn something from the data. For example, a visualization can be a bar chart, a pie chart or a line chart, all generated from the same data set. Some desktop applications, such as, for example, spreadsheet applications, feature fast computation of data and easy access to visualizations. However, typically the set of visualizations in a desktop application is limited to those that are supported by the application. Thus, if, for example, a spreadsheet application does not offer a tree map, then there will be no opportunity to access this type of visualization within the application.

Desktop applications have comparatively slow ship cycles. It can take years from noticing an interesting visualization to including it in an application. Specialized visualizations, such as visualizations used for one particular type of business, are very unlikely to ever be added to most software applications. In general, to work around these issues, users typically upgrade to an all-visualization application that suits their needs, or copy data out of a spreadsheet to another solution (such as, for example, a website) that offers the visualization they want.

Some software applications offer 'add-in' models that require specialized, application-specific code. Some vendors are then willing to deploy visualization add-ins written to this specialized, application-specific code. However, many visualization creators write visualizations in languages that are not supported by the add-in models.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The pluggable web-based visualization technique described herein pertains to a technique for providing pluggable web-based visualizations for applications. The technique creates a plug-in model for visualizations that hosts web-based chart (e.g., visualization) controls within a desktop application, and correctly handles translation of data to web formats. The plug-in receives instructions for creating visualizations from the web, where visualizations can be listed in web-based listings. The plug-in also passes data updates, commands, selection, settings and options back and forth from the software application (for example, a spreadsheet) to visualization via the embedded chart control.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the pluggable web-based visualization technique, reference is made to the accompanying drawings, which form a part thereof, and which show by way of illustration examples by which the pluggable web-based visualization technique described herein may be practiced. It is to be understood that other embodiments may be utilized and structural changes may be made without departing from the scope of the claimed subject matter.

1.0 Pluggable Web-Based Visualization Technique

The following sections provide background information with respect to how visualizations are created and used, information on visualizations on the web, and an overview of the pluggable web-based visualization technique. An exemplary architecture and processes for employing the technique are also provided, along with details of exemplary embodiments of the technique.

1.1 Background Information on Creation and Use of Visualizations

New visualization techniques are constantly being invented. One can divide the potential users of these visualizations into three (often overlapping) audiences: end-users who want to apply the visualizations to their own data; visualization writers who wish to create new visualizations; and application developers that want to enable others to use new visualizations with the applications they develop. End-users often have no choice but to become adept at moving data between applications or to wait for updates to their favorite software applications that may or may not include new visualization capabilities. Visualization developers often need to create a visualization from scratch or they may build upon visualization toolkits. In order to use a toolkit, they are forced to use the language and data structures that the toolkit requires and their visualization, in turn, will only be useful to people who are using those toolkits. Finally, application developers, hoping to incorporate one of the visualizations themselves, either must adopt the toolkits or translate the visualization code into their own data structures and rendering systems.

1.2 Visualization on the Web

Increasingly, the Internet is being used as a delivery mechanism for visualizations. There are several architectures for constructing visualizations on the web. For example, visualizations can be generated as image files that can be embedded in a webpage (e.g., server rendering). Alternatively, client-side code and objects (e.g., JavaScript™ code, Flash objects, and Java™ objects) have been used to compute a visualization on a user's computer (e.g., client rendering). The present technique can use either strategy (server or client rendering), but offline visualizations are preferably supported by client rendering.

Additionally, several tools allow site designers to build visualizations easily. For example, some applications provide infrastructure that allow a web developer to assemble a coordinated series of visualizations that can be embedded in a web page. The web developer can choose from a variety of provided visualizations. The end-user can switch between views, select and filter data, and explore the resultant data. However, these web-based tools display visualizations on web pages and do not have an ability to accommodate dynamic visualizations in desktop applications. Additionally, these visualizations cannot be rendered when a user does not have an Internet connection.

1.3 Overview of the Technique

The pluggable web-based visualization technique leverages deployment of visualizations across the web, and, in one embodiment, uses Internet protocols as a communication mechanism. The technique allows a user to add a visualization to an application dynamically, without requiring recompilation of an existing application or the instructions for creating a visualization. (For purposes of the following discussion, a visualization will be defined as instructions for creating a visualization, while a rendered visualization will be called just that.) The technique allows this functionality by providing a standard method for host applications to host and communicate with visualizations. As a result, application developers now have a much easier task: they must build infrastructure only once, in the language of their choice, and add a mechanism to select particular visualizations. Visualization developers can write their visualization, using their favorite visualization framework or toolkit, and add support for the technique's interface to the visualization, and post the visualizations on websites or other locations on the Internet. Developers can even write a thin adapter to translate existing visualizations to be compatible with the technique's interface. Finally, end-users can use a pluggable web-based visualization-enabled application of their choice to render any available visualization without waiting for an update to the application that incorporates the latest visualizations.

1.4 Exemplary Architecture.

The pluggable web-based visualization technique enables visualizations to be dynamically (without recompilation) added to applications in real-time. In order to do so, both the visualization and the application must support a pluggable web-based visualization interface.

Figure 1:
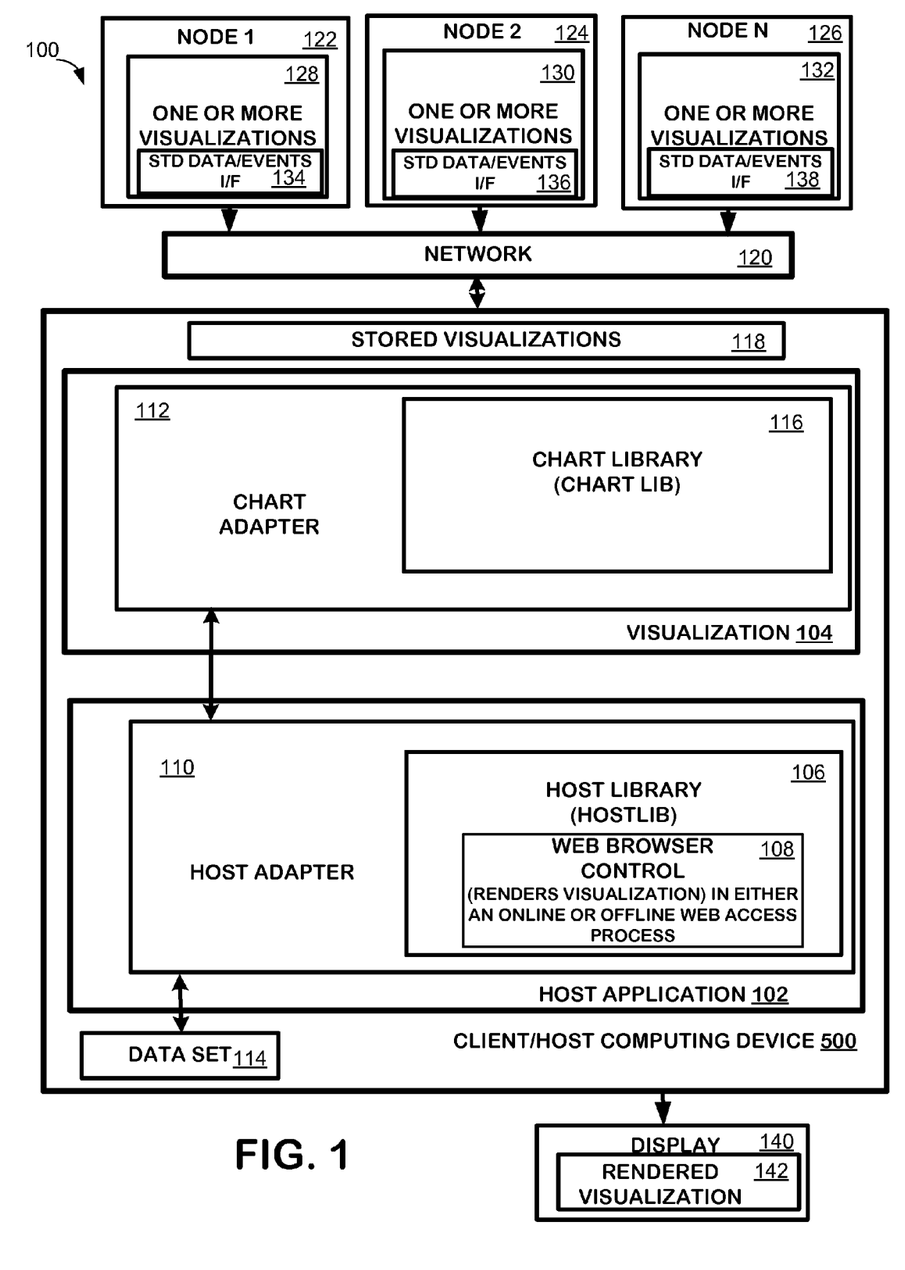
FIG. 1 is an exemplary architecture for employing one exemplary embodiment of the pluggable web-based visualization technique described herein.

FIG. 1 depicts one exemplary architecture 100 for rendering a visualization of data at a host application 102 according to one embodiment of the technique. A general purpose host computing device 500, such as will be discussed in greater detail with respect to FIG. 5, hosts a software application 102 that employs a host adapter 110 that includes a host library 106, and a web browser control 108. The host application 102 also interfaces with a dataset 114 for which a visualization is sought.

The web browser control 108 renders a visualization (to a display 140, for example) to create a rendered visualization 142. Many web browsers now come in embeddable form. Applications with embedded web browsers can typically send commands (e.g., in Javascript™ or other appropriate language) to the browser. In one embodiment, the browser control 108 is used to render the visualization 104, which is implemented in HTML, or any language that can be embedded in a web browser, such as, for example, Microsoft's® Silverlight™, Javascript™, Java™, or Flash. The host application 102 sends data and commands to the visualization 104 and the visualization 104 sends back events that ultimately allow a visualization to be rendered at the host application 102 using the browser control 108 to create a rendered visualization 142. It should be noted that in one embodiment of the technique, the web browser control 108 can be run in one of two separate operating system processes, one with no web access and another with web access. The benefits of the approach are process isolation and data privacy. For example, as to process isolation, errors in the pluggable web-based visualization technique's code (accidental or malicious) cannot harm the application process. As to data privacy, each visualization declares itself (for example, in its .xml file) to be either requiring network access or not (to render its visualization). Those that require network access could potentially abuse the user's data by sending it to a server somewhere. These will be presented as being more dangerous by the host application to users. When non-web access visualizations are executed, one embodiment of the pluggable web-based visualization technique runs them in a process that cannot access the network, making them safer to use.

In one embodiment, the technique provides two libraries to help developers add pluggable web-based visualization support to the applications and visualizations. A host library 106, herein called "HostLib", on the host computing device 500 that hosts the application, provides commands that are used to render the visualization 104. Another chart library 116, herein called "ChartLib", handles communications for a visualization 104, and can also include an optional lightweight visualization framework, which is a library of predefined chart parts (like legends, axes, titles, standard series types, etc). All of these can be used as building blocks for a new visualization. Nothing in the design precludes interoperability with applications and visualizations written in any various languages.

In one embodiment, the host application 102 is an extension to a spreadsheet application, such as, for example, Microsoft® Excel® 2007, implemented using standard add-in mechanisms such as Microsoft® Excels® Visual Studio Tools for Office.

In one embodiment of the technique the dataset 114 that is used to render the visualization 104, is in the form of one or more tables. In one embodiment, the dataset 114 is computed at the software application 102 on the host computing device 500. The commands for creating the visualization are obtained by using ChartLib 116. The chart library 116 takes in the dataset 114 and commands from the host software application 102. It should be noted that the use of ChartLib in one embodiment of the technique is optional. Chart developers may choose to use different approaches to support chart functionality (for example, their own JavaScript library, etc). The same holds for the use of HostLib in adding chart support to a host application—some application developers may use their own approach, and not use HostLib.

The architecture 100 also includes a chart adapter 112 and a host adapter 110, as discussed above. The adapters 110, 112 allow the user to write fairly simple calls. In one embodiment of the technique, the visualization 104 and the host application 102 communicate via very specific Javascript™ and XML formats. The host adapter 110 takes care of the overhead of controlling the window that will show the rendered visualization 142. It also interfaces with the web browser control 108, pointing it at the right URL, sending it data, selection, styling information, and custom parameter settings. The host adapter 110 also lets the host application 102 make calls to the visualization 104 in a language that is more comfortable. That is, for example, in one embodiment of the technique, the host application 102 can call the host adapter 110 in familiar C# code (e.g., hostAdapter.SetDataTable(myDatatable) where the Datatable is an easy to use data structure. The host adapter 110 takes that data table in familiar C#, changes it into the appropriate XML format, and then changes it into a call like javascriptEngine.CallCommand ("SetDataTable", XMLVersion). On the other side, when a developer creates a visualization 104, it is much easier for the developer to write a simple command, "SetChartData" that takes the new data, than it is to write an XML to Datatable converter.

In one embodiment of the technique, the host software application 104 on the host computing device 500 selects instructions for creating visualization from one or more visualizations or collections of visualizations 128, 130 and 132, published to nodes on the network 122, 124, 126. These nodes on the network 122, 124, 126, can be, for example, stand alone computing device, databases, websites or servers. The host application 102 selects the visualizations 128, 130 and 132 over a network 120 and downloads them to the host computing device 500. The host computing device 500 can store the selected and downloaded visualization in a data store 118 and can render them (e.g., to a display 140 of the host computing device 500) using the host application 102 and the selected and received instructions for creating a visualization 128, 130, 132. Each of these visualizations 128, 130, 132 employs a standard data and events interface 134, 136 and 138, that allow the visualization to be plugged into the host software application 102. Once downloaded, the hosting software application 102 can send and receive updates to the visualization 104 and select and receive preferences and settings for the visualization 104 using commands from the host library 106 and the chart library 116.

1.5 Exemplary Processes Employed by the Pluggable Web-Based Visualization Technique.

The following paragraphs provide descriptions of exemplary processes for employing the pluggable web-based visualization technique. It should be understood that in some cases the order of actions can be interchanged, and in some cases some of the actions may even be omitted.

Figure 2:
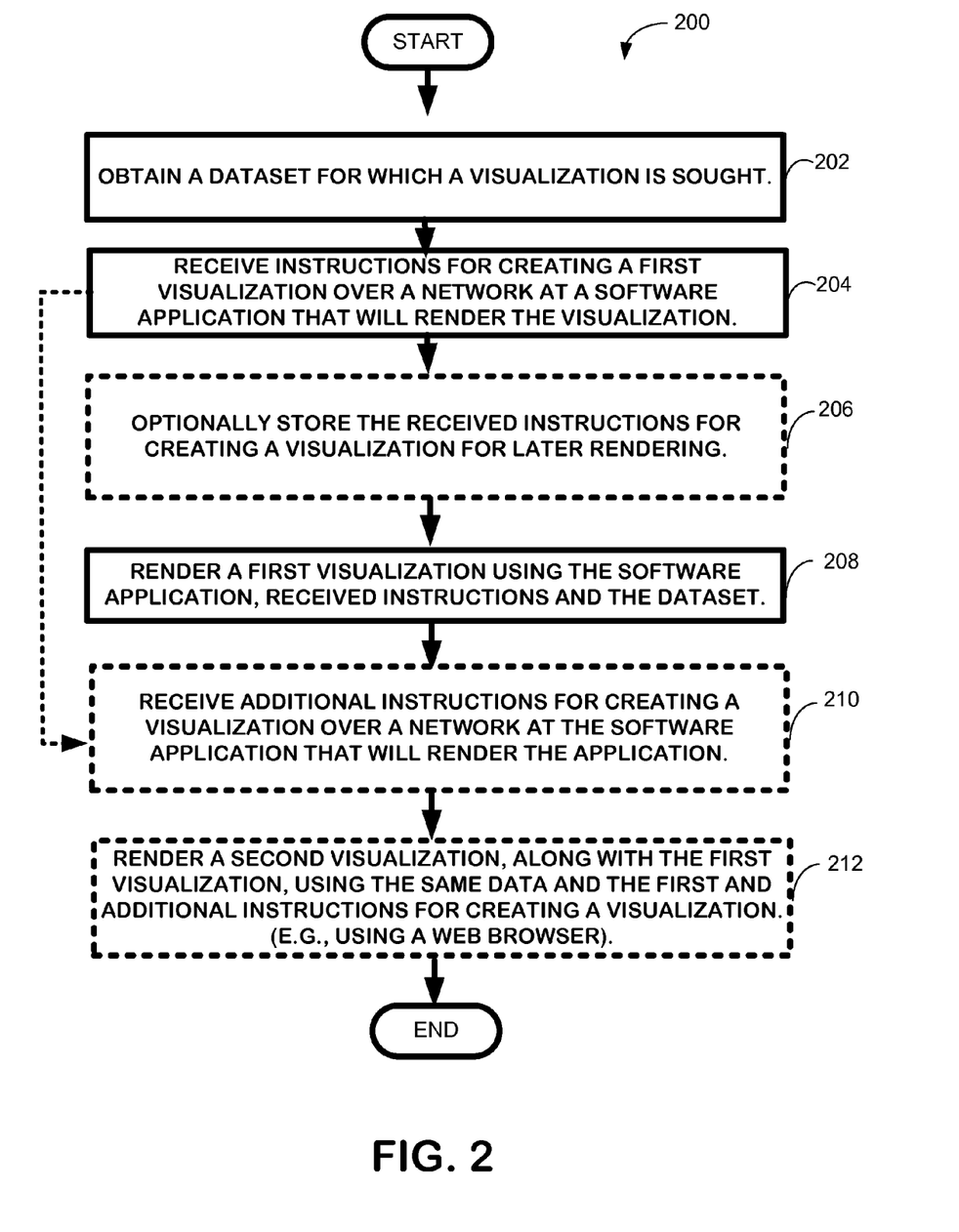
FIG. 2 depicts a flow diagram of an exemplary process for employing one embodiment of the pluggable web-based visualization technique.

FIG. 2 depicts an exemplary computer-implemented process 200 for creating a chart or visualization of data for a software application in accordance with the technique described herein. As shown in FIG. 2, block 202, a data set for which a visualization is sought is obtained. For example, the software application can compute the dataset or the dataset can be obtained from another source. In one embodiment, the dataset is formatted as one or more tables of rows and columns.

Instructions for creating a first visualization are received over a network at a software application that will render the visualization, as shown in block 204. The received instructions for creating the first visualization are compatible with more than one software application without requiring changes to the instructions or the software application. The received instructions for creating the first visualization or chart can optionally be stored, for example, for rendering the visualization at a later time, as shown in block 206.

Once the dataset and the instructions are obtained, the software application then renders the first visualization using the software application, the received instructions for creating the first visualization and the dataset, as shown in block 208. The rendering can take place using the received instructions in real-time or can take place at a later time using the stored instructions and the host library. This feature is especially useful when the host computer is not connected to the network, because the stored instructions can be used to render the visualization at any time, even when no network connection is available.

Additionally, as shown in block 210, instructions for creating a second visualization can also be received over the network. The second visualization can also be rendered, simultaneously with the first visualization if desired, using the dataset and the host software application, as shown in block 212. In one embodiment of the technique, the visualizations are rendered at the host computer using a browser. Additionally, in one embodiment of the technique, it is possible to link objects rendered in the first visualization and the second visualization by a user selecting the objects to link and applying changes to the linked objects in both the first visualization and the second visualization which automatically update both the first visualization and the second visualization based on the user's actions. This is called brushing and linking. It should be noted that blocks 204-208 and blocks 210-212 can be executed in parallel. That is, it is not necessary that the first visualization be rendered before a new visualization is requested.

Figure 3:
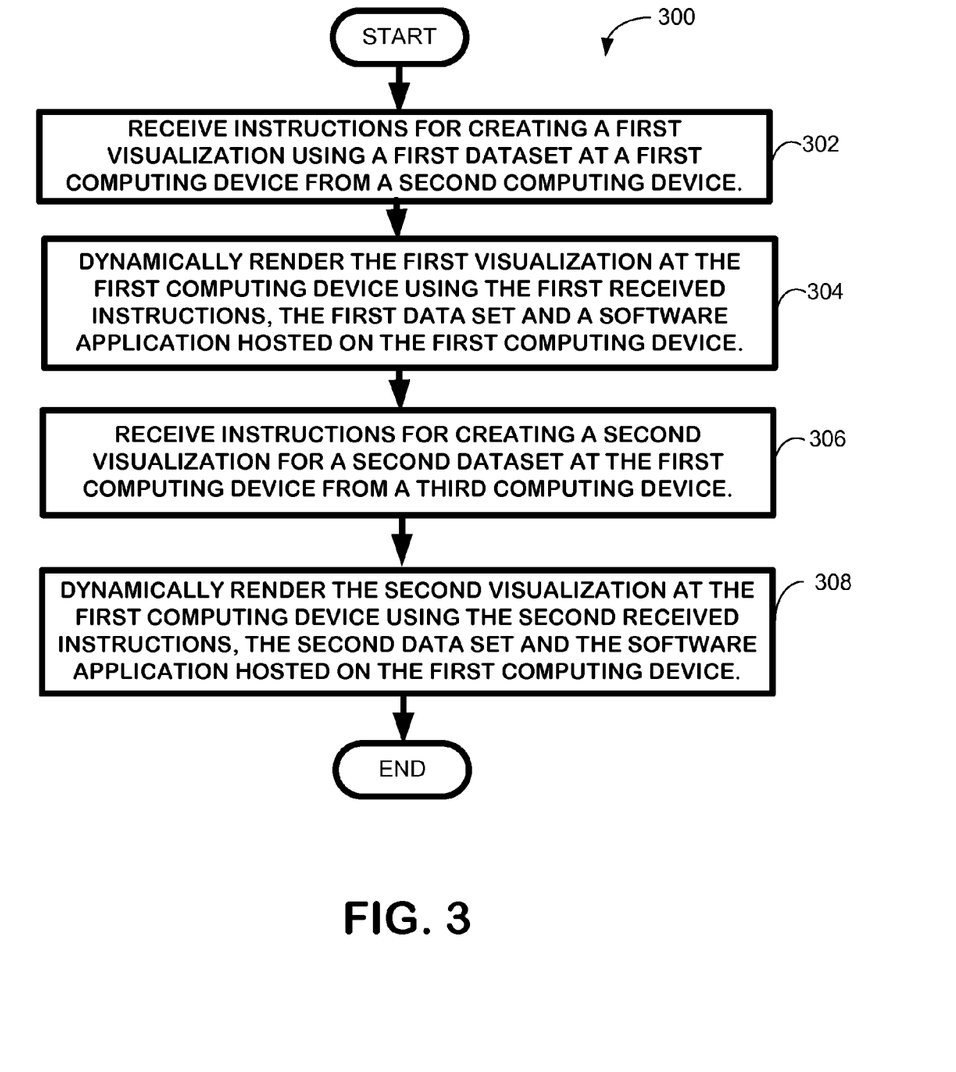
FIG. 3 depicts a flow diagram of another exemplary process for employing one embodiment of the pluggable web-based visualization technique.

FIG. 3 depicts another exemplary computer-implemented process 300 for dynamically displaying a chart representing a set of data in accordance with the pluggable web-based visualization technique. As shown in block 302, instructions for creating a first visualization of a first dataset are received at a first computing device from a second computing device. As shown in block 304, the first visualization is then dynamically rendered (e.g., without recompiling the instructions for creating the visualization or the software application) at the first computing device using the received instructions and the first dataset. It should be noted that first visualization, or any visualization for that matter, can be divided into sub-visualizations by subdividing the data of the first dataset, and dynamically rendering the visualizations for the sub-divisions of the data.

The pluggable web-based visualization technique is not limited to receiving visualization from only one other source. In fact, the host computer can select and receive visualizations from any number of nodes on the network and can render these visualizations without changes to either the visualization or the software application. To this end, in one embodiment, as shown in FIG. 3, block 306, instructions for creating a visualization of a second dataset are received from a third computing device. The first visualization and the second visualization are then dynamically rendered using the received instructions for the first dataset and the received instructions for the second dataset on the first computing device, as shown in block 308.

An exemplary architecture and exemplary processes for employing the pluggable web-based visualization technique having been discussed, the following section provides additional details and explanations regarding various exemplary embodiments of the technique.

1.6 Details and Features of Various Exemplary Embodiments of the Technique.

In the following sections, more details of the design of visualizations and the design of the host will be discussed. Next, the interaction mechanisms that allow the visualization to send back events to the host will be discussed. Additionally various features are detailed. These include aggregation of data and the creation of sub-visualization (e.g. via column selection), which allows visualizations to show appropriate subsets of data, and styling and theming, which allow visualizations to share a common visual appearance. Lastly, persistence and security, which allow host applications to store and save visualizations will be discussed.

1.6.1 Defining a Visualization

Figure 4:
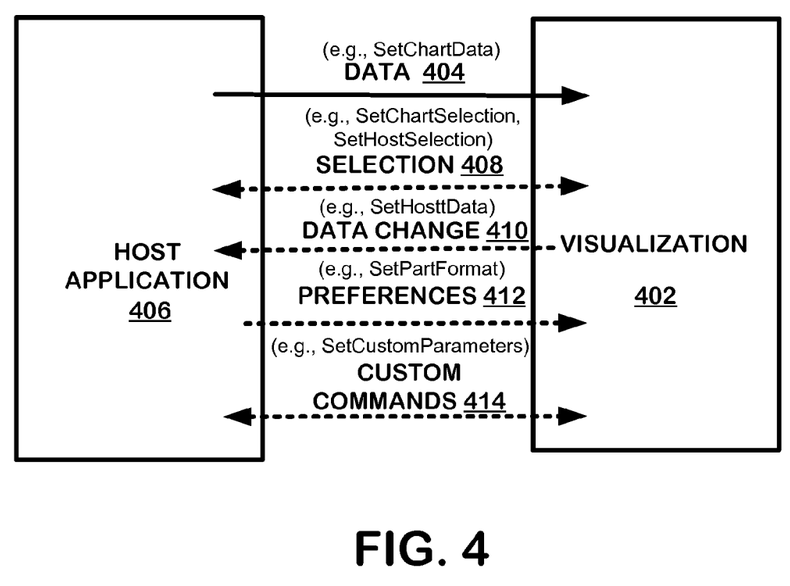
FIG. 4 depicts communications between a host software application and a visualization in one embodiment of the pluggable web-based visualization technique.

In the pluggable web-based visualization technique's framework, a visualization can be thought of as a web page which receives data from a host application. Visualizations, hence, maintain a very simple interface. FIG. 4 provides an overview of the specific message traffic that is sent between a visualization and a host application in one embodiment of the technique and the ChartLib and HostLib mechanisms that manage this message traffic. To this end, as shown in FIG. 4, visualizations 402 accept data 404 from the host application 406. In addition, they may be able to communicate a selection 408, take color and theme updates 410 and preferences 412, and share custom parameters and commands 414 as specified by the host application 406.

In one working embodiment, visualizations communicate entirely through a JavaScript™ bridge with the host application.

In one embodiment of the technique, the communication mechanism is managed by HostLib, which runs on the host side, and ChartLib, which is available on the visualization/chart side. The host application communicates with the visualization through Hostlib. The visualization, in turn, receives all its messages through ChartLib commands. HostLib and ChartLib are responsible for serializing and deserializing data (respectively), and for packaging other commands.

From a hosting perspective, an application developer can add HostLib to his application. Hostlib manages the web browser component, and the communication between the host app and the visualization(s). The host application can make the calls in FIG. 4 and register for call backs (e.g., by subclassing the BrowserHost class). HostLib transforms the data and translates it into an appropriate format for the visualization. The data transformations include selecting of columns, aggregation of columns, filtering, sorting, and limiting the data. HostLib also supports additional transformations needed to support small multiples (a matrix of visualizations). It also performs different functions such as selecting certain data to be used in a visualization, specifying user preferences and accommodating parameter changes in the visualization.

Similarly, from a visualization's perspective, a visualization developer includes Chartlib (which in one working embodiment is implemented in both Silverlight and Javascript). They can register, for events from the ChartLib, which will handle incoming messages to the visualization. In one working embodiment of the pluggable web-based visualization technique, Chartlib can be used to building custom visualizations (in one working embodiment this was done using Silverlight), and can be used to wrap prewritten visualizations to use them with the technique (in one working embodiment this was done using Javascript™)

1.6.2 WebChart Host/Visualization

In one embodiment of the technique, the basic commands include SetChartData, SetChartSelection, SetHostSelection, SetHostData and SetPartFormat, as well as SetChartData and SetCustomParams. FIG. 4 provides a diagram of the communications between a host application 406 and the visualization 402. As can be seen in FIG. 4, 402, the SetChartData command 404 is sent from the host application 406 to the visualization 402. This command provides the dataset to be rendered to the visualization. The selection commands 408, SetChartSelection and SetHostSelection, are sent back and forth between the visualization 402 and the host application 406. The command for changing data 410, the SetHostData command, is sent from the visualization 402 to the host application 406. The SetPartFormat command is used to send preferences 412, such as, for example, styles and themes, and is sent from the host application 406 to the visualization 402. Lastly, custom parameters 414 are sent via the SetCustomParameters command which is sent back and from between the visualization 402 and the host application 406. These commands are discussed in more detail later.

SetChartData is the basic call of the pluggable web-based visualization technique, and is implemented by every visualization. This command causes the the visualization to receive a dataset (e.g., in XML). In one embodiment of the technique, the dataset is formatted as one or more tables. Typically each data table consists of a series of named and typed columns and a number of rows. Most data structures can be represented in tabular form readily. In one embodiment of the technique, the HostLib and ChartLib libraries provide support for translating a dataset to and from XML.

In addition to the SetChartData command, every visualization and host application can choose to support additional commands which provide a richer visualization experience. The SetChartSelection and SetHostSelection commands are sent from the host application to the visualization and back, respectively, to communicate the rows and columns that are logically selected by the host application, or other visualizations. Visualizations can be grouped in different ways by the host, so that they share selection information among themselves (through the host), and optionally with the host (if the host has a native way of displaying the data and its selections). This selection mechanism forms the basis for brushing and linking support as well as the ability for visualizations to filter data based on the selection, as will be discussed in section 1.6.7 below. In one embodiment, the visualizations share selection information using a linking ID and an associated action type. The action specifies how the visualization should reflect that data that is selected (e.g., highlight the selected data, hide/filter the selected data, and so on).

The SetHostData command allows the visualization to request that the host application change the data based on actions in the visualization. Changing data will be discussed in greater detail later in section 1.6.4.

The SetPartFormat command allows the host to send styles and themes to the visualization. Themes and styles are described in more detail later in section 1.6.8.

The SetCustomParams command allows a visualization to accept custom parameter values from the host application. In one embodiment, host applications that support a UI to examine and change custom visualization parameters can send parameter values to the visualization. Conversely, when parameters are changed in the visualization, such as when a map is moved or an axis is altered in the visualization, the new values are sent back from the visualization to the host application through this command. These custom parameters are also persisted with the visualizations by the host application, as will be described in more detail later in section 1.6.3.

1.6.3 Declaring Custom Parameters

Each visualization may have its own custom parameters, and each visualization has its own capabilities. If a visualization requires, for example, a field of type "ordinal", then mapping it to a string value may not be useful. Visualizations may declare their interfaces by providing an optional manifest file. This file specifies the capabilities of the visualization, and which columns (streams) of data it can accept. In addition, the file can describe any custom parameters that the visualization supports and can announce any other relevant metadata. By providing a separate capabilities file, users can search for certain capabilities amongst a large number of charts/visualizations stored on a website without needing to invoke and examine each of them.

1.6.4 Updating and Modifying Data

One advantage of embedding visualizations into a host application is that there can be a tight integration between user editing and updating the edited data and the visualization. If, for example, the visualization is embedded in a spreadsheet, the user need not switch context from the visualization application to a spreadsheet to correct data errors, then switch back to update the visualization. Instead, the user can interactively modify or correct data, and see it instantly updated in the visualization or manipulate the data in the visualization and have it update the data in the host. One way of accomplishing this is for the host application to detect changes to the data and automatically send the data to the visualization.

Data updating can work in both directions: visualizations can choose to call the SetHostData command to update data on the host, perhaps as a result of the user manipulating shapes within the visualization. In this case, it is preferable that the host application provide a protection mechanism to help prevent accidental data changes by the user.

1.6.5 Aggregating Data and Choosing Columns

Two different approaches to datasets seem to be common among visualization packages. First, a visualization package can visualize input data without transformation. This is done, for example, in Microsoft® Corporation's Excel®. In Excel®, two columns of data are understood as x and y axes. In other visualization packages, visualizations implicitly contain aggregation: a user chooses a dimension and measure, and the application that renders the visualization adds, averages, or counts the measure in order to visualize the values. Since one goal of the pluggable web-based visualization technique is to conveniently allow the embedding of a variety of visualizations in a host application, the technique makes aggregation capabilities available without requiring support from the visualization. Of course, some visualizations, such as histograms, prefer to do their own aggregations, so aggregation is an optional aspect of the technique.

Aggregation is supported in the host application, within HostLib. HostLib can transform a data table, given a few parameters. Columns of the data table can be used as aggregation values, filters, and sort orders. The aggregated values then can be sent to the visualization. Additionally, columns of the aggregation can be split off to enable small multiples. Small multiples use the same basic visualization or chart to display different slices of a data set as visualizations. In one embodiment of the technique, the host maintains mapping objects, which maintain a mapping from unaggregated rows to their aggregated results. These allow the host to subsequently map selection rows from the visualization to the host domain, or from the host to the visualization domain (between the pre/post query data rows). In this way, selection information can be passed between aggregated visualizations, non-aggregated visualizations, the original host data, and visualizations aggregated on a different column or expression.

In one embodiment, aggregation is performed by the host application rather than the visualization for two reasons. First, this allows aggregation to be implemented for any visualization, including those that are unable to scale to large datasets. Second, the host application can also provide significant optimization, since the individual visualizations do not need to be sent nor is it necessary to send the entire data table, but only the data that is actually visualized. A huge dataset can be reduced to only few data points in some of the aggregations. Alternatively, there are already visualizations that aggregate or optimize the renderings of data based on the view (for instance, a scatter plot with dense areas can choose not to render every data instance). This is still supported by sending all the data to the visualization.

1.6.6 Non-Rectangular and Multi-Table Data

In one embodiment of the technique, the SetChartData command sends data via a data table, which represents columnar data easily. Other common data structures can be readily normalized into tabular form. The host application is responsible for normalizing its native data structures into one or more tables that the visualization can use. For example, network models can be represented with two tables, one for node data and the other for edges.

1.6.7 Interactivity: Brushing and Linking WebCharts

There has been a great deal of research showing the benefits of linking together multiple visualizations via selection and highlighting behaviors. There are many types of actions that can be propagated across brushing and linking, including selecting subsets of data, providing detail on a particular item, and restricting and filtering data. The present technique implicitly supports all of these by providing a universal selection mechanism.

In the technique's framework, a selection is created by a user in either the host application or in a visualization. If the user has made a selection within a visualization, that selection is sent back to the host application as a set of data columns, and the selected rows within each column (since different column/row selections are supported). Hostlib provides infrastructure for translating the selection back to the original dataset. (In the case of aggregation, for instance, this means computing which rows of original data correspond to the aggregated values). With the selection in the domain of the original data, the host application can now both reflect the selection in its own user interface, if appropriate, and then send the selection to other visualizations that refer to the data.

Each visualization can respond to the selection as is most appropriate. In many visualizations, for example, selection commands correspond to highlighting particular shape objects within the display. However, in one embodiment, the technique has also implemented a "details on demand" visualization that merely prints all values from selected columns, and resolves image URLs as pictures. In one embodiment, to enable linking and brushing, all communication channels between a visualization and a host application work as usual, except that selection is routed through the HostLib.

1.6.8 Styling and Theming

In one embodiment of the pluggable web-based visualization technique, a host application can choose to support styling and theming for its hosted visualizations. A style is a collection of typefaces, text sizes, and colors, pen sizes, pen patterns, and so forth. For example, styles specify the color and typeface for standard parts of a visualization, such as the background color, the color of foreground objects, and the typeface for captions. A theme is a collection of styles that, together, describe the way that a chart is rendered. Using styles and themes, a host can ensure that all charts use the same color palette and similar typefaces. In one embodiment of the pluggable web-based visualization technique, implementation of styles for a visualization is optional. For example, a visualization implementation can choose to act on or ignore any portion of these commands. A theme typically includes color selections for both selected and unselected items, for multiple series of data, as well as similar information for other parts of a standard chart, like the legend, axes, titles, etc.

In one embodiment of the technique, styles and themes can also used to enable small multiples and other grouped visualizations. For example, in a small multiple, it is often desirable to hide axis captions and legends that are shared between the several charts. Hence, the style information can include a "hidden" label, which allows the host to request that the visualization hide its unneeded axis labels.

1.6.9 Persistence: Save-Load and Copy-Paste

It is useful for applications to provide persistence for operations such as saving and loading. For example, when the host application or its documents are saved, the visualization should preferably be saved with it/them. Additionally, users should be able to copy and paste visualizations into other applications. Hostlib provides a mechanism for persisting (and reloading) a visualization. In one embodiment, this mechanism includes the original URL, a reference to the source data, any parameter settings that the user has set, and current style settings. Optionally, the persisted version of the visualization can include an offline executable version of the visualization instructions (e.g., an HTML page and related resources). Additionally, the persistent form of a visualization can include a bitmap snapshot of the visualization, to be used as a fallback when executing the visualization is not possible, for example, when a visualization requires a network connection to build a rendering, and the network connection is not available.

1.6.10 Offline Use, Privacy, and Security

Two great concerns that are associated with web-based visualizations is the ability to use the visualization when not connected to the Internet and privacy/security issues surrounding the use of visualizations. Visualizations that do not require the Internet can be used offline, while some visualizations cannot be used when no network is available. Offline use is possible for those visualizations that support disconnected operation from the Internet. This means that once acquired via the net, the visualization will continue to function if all the code is available and the visualization does not require external data.

One embodiment of the technique can employ at least three types of visualizations:

1) Visualizations that, once downloaded, can continue to function without an active connection.

2) Visualizations that can run locally, but require external data. This is the case for, for example, a world map. When a user pans or zooms in on the map, other tiles of the map are downloaded from a tile-server. In addition, this particular visualization uses an external service for turning city names into longitude and latitude coordinates. While data such as city names is sent to the network, most of the data stays resident on the local system. These two visualizations continue to work as long as no new external information is needed and the data is not sent out on the network (e.g., Internet). The third case of visualizations cannot be moved offline:

3) Visualizations that run externally. These are cases where the visualization is created on a separate server, and either a bitmap, or laid out graphical objects are sent to the client. These visualizations can only be run when the host application is connected the network.

Visualizations of the first type do not share their data at all with the external world. Visualizations of the second type share some information, but the actual visualization is still computed and rendered locally. Visualizations of the third type require sharing the visualization with an external service.

Any system that loads programs from the web represents potential security concerns, both with the data that is being shared and with other data resident on a local client. Since, in one embodiment of the technique, visualizations are embedded in a browser, the same security conditions that are used for general internet browsing are in place—that is the code runs in a sandbox and does not have access to data except that which is explicitly passed to it.

2.0 The Computing Environment

The pluggable web-based visualization technique is designed to operate in a computing environment. The following description is intended to provide a brief, general description of a suitable computing environment in which the pluggable web-based visualization technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 5:
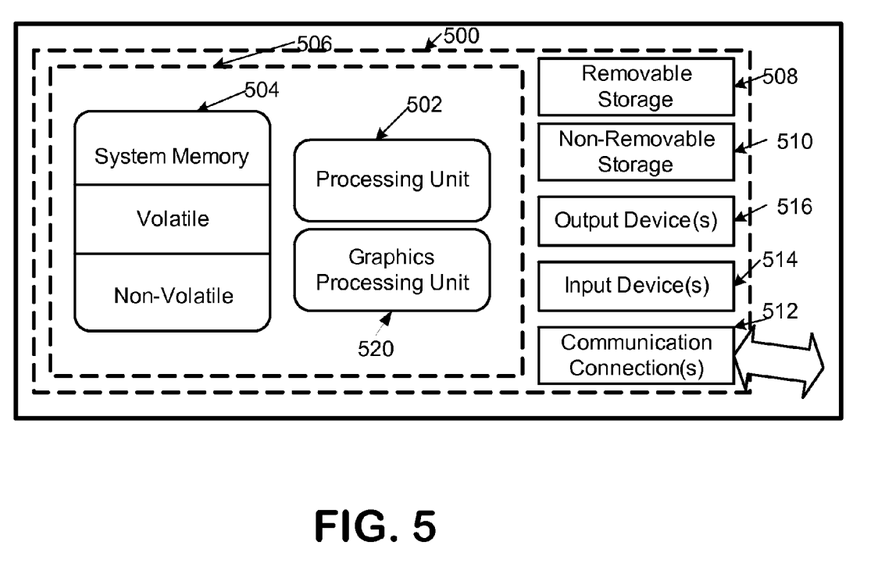
FIG. 5 is a schematic of an exemplary computing device which can be used to practice the pluggable web-based visualization technique.

FIG. 5 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 5, an exemplary system for implementing the pluggable web-based visualization technique includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cwebsitetes, magnetic tape, magnetic disk storage or other magnetic storage devices, or any other medium which can be used to store the desired information and which can accessed by device 500. Computer readable media include both transitory, propagating signals and computer (readable) storage media. Any such computer storage media may be part of device 500.

Device 500 also can contain communications connection(s) 512 that allow the device to communicate with other devices and networks. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may have various input device(s) 514 such as a display, keyboard, mouse, pen, camera, touch input device, and so on. Output device(s) 516 devices such as a display, speakers, a printer, and so on may also be included. All of these devices are well known in the art and need not be discussed at length here.

The pluggable web-based visualization technique may be described in the general context of computer-executable instructions, such as program modules, being executed by a computing device. Generally, program modules include routines, programs, objects, components, data structures, and so on, that perform particular tasks or implement particular abstract data types. The pluggable web-based visualization technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for creating a dynamic visualization of data for a software application:
    using a computing device for:
        obtaining a dataset for which a dynamic visualization is sought at the computing device that hosts the software application;
        receiving instructions for creating a first dynamic visualization over a network at the software application hosted on the computing device, wherein the software application hosted on the computing device employs a host adapter that interfaces with one or more dynamic visualizations and comprises a host library that provides commands that are used to render the dynamic visualization using the software application; and
        rendering the first dynamic visualization at a display of the computing device using the software application, the received instructions for creating a dynamic visualization, the host adapter and the obtained dataset so as to create the dynamic visualization that automatically changes on the display when the software application changes the dataset.

2. The computer-implemented process of claim 1, wherein the received instructions for creating the first dynamic visualization using the software application are stored on the computing device rendering the first dynamic visualization.

3. The computer-implemented process of claim 1, wherein the network is the Internet.

4. The computer-implemented process of claim 1 wherein the instructions for creating a dynamic visualization are compatible with more than one software application without requiring changes to the received instructions or the more than one software applications.

5. The computer-implemented process of claim 1, further comprising:
    receiving instructions for creating a second dynamic visualization over the network;
    at the software application, simultaneously rendering the first dynamic visualization and the second dynamic visualization using the obtained dataset and the received instructions for creating the second dynamic visualization.

6. The computer-implemented process of claim 1, wherein the created first dynamic visualization is rendered using the software hosted on the computing device and a browser.

7. The computer-implemented process of claim 5, further comprising a user linking objects rendered in the first dynamic visualization and the second dynamic visualization by user action.

8. The computer-implemented process of claim 7, further comprising the user selecting an object in the first dynamic visualization and causing visible changes to occur in one or more linked objects in the second dynamic visualization.

9. The computer-implemented process of claim 1, wherein the first dataset is formatted as one or more tables of rows and columns.

10. The computer-implemented process of claim 1, wherein the received instructions for creating the first dynamic visualization are created using a library of predetermined commands for creating a dynamic visualization.

11. The computer-implemented process of claim 1, wherein the first created dynamic visualization is rendered using a web browser without network access, and wherein the first created dynamic visualization has an identifier that designates it to be rendered with a web browser without network access.

12. The computer-implemented process of claim 1, further comprising using the host adapter to communicate selection, preferences and parameter changes from the software application to the first dynamic visualization.

13. A system for displaying a dynamic visualization of data using a software application, comprising:
    a general purpose computing device;
    a computer program comprising program modules executable by the general purpose computing device, wherein the computing device is directed by the program modules of the computer program to,
    at the software application that is hosted on the computing device and that employs a host adapter that comprises a host library and a web browser control, compute a dataset for which a dynamic visualization is sought;
    receive instructions for creating a dynamic visualization using the host software application, wherein the instructions are created using a library of predetermined commands that allow the dynamic visualization to be rendered at the host software application as well as other software applications written in different programming languages from the software application that is hosted on the computing device;
    render the dynamic visualization using the software application that computed the dataset, the web browser control and the received instructions for creating a dynamic visualization; and
    automatically change the rendered dynamic visualization in real time when the software application changes the dataset.

14. The system of claim 13, wherein the received instructions for creating a dynamic visualization using the computed dataset are obtained over a network from a collection of instructions for creating different types of dynamic visualizations.

15. The system of claim 13, further comprising a module for aggregating data in the dataset prior to rendering the dynamic visualization with the received instructions.

16. The system of claim 13, further comprising a module for modifying the instructions for creating the dynamic visualization, comprising:
- sending and receiving updates to the instructions for creating a dynamic visualization; and
- selecting and receiving preferences and settings for the instructions for creating a dynamic visualization; and
- rendering the modified dynamic visualization with the software application.

17. A computer-implemented process for dynamically displaying a dynamic visualization representing a set of data, comprising:
- using a first computing device for:
- receiving instructions for creating a first dynamic visualization of a first dataset from a second computing device;
- dynamically rendering, without recompilation, the first dynamic visualization of the first dataset using a software application hosted on the first computer, the received instructions and the first dataset at a display of the first computing device;
- changing the first dataset using the software application hosted on the first computer,
- dynamically rendering changes to the first visualization, without recompilation, using the software application hosted on the first computer, the received instructions and the changed first dataset at a display of the first computing device.

18. The computer-implemented process of claim 17 further comprising partitioning the data of the first data set and using the received instructions for creating the first dynamic visualization to create a set of dynamic visualizations.

19. The computer-implemented process of claim 17, further comprising:
- receiving instructions for creating a second dynamic visualization of a second dataset from a third computing device;
- simultaneously rendering the changes to the first dynamic visualization and the second dynamic visualization using the received instructions for the second dynamic visualization of the second dataset using the software application on the first computing device.

* * * * *